N. G. BOUILLAT.
HANDLE BAR FOR CYCLES.
APPLICATION FILED MAY 14, 1912.
1,053,150.
Patented Feb. 18, 1913.
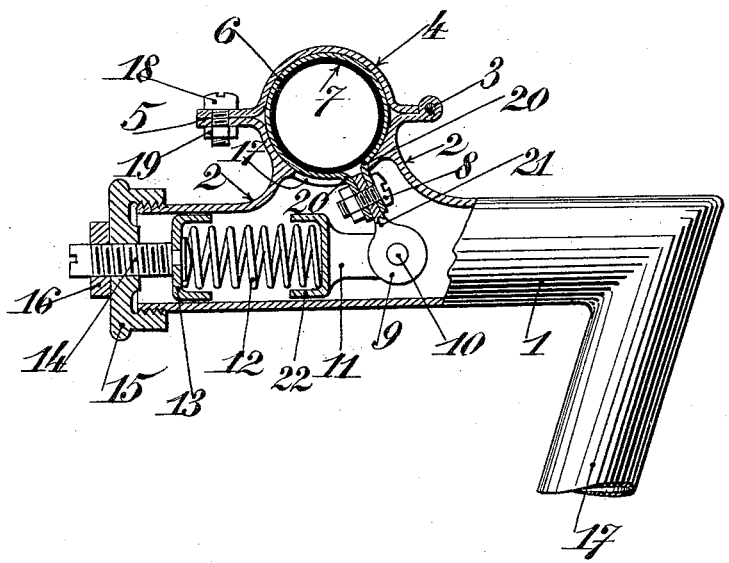
WITNESSES:
John C. Sanders
John A. Percival
INVENTOR:
Nicolas Gaston Bouillat,
BY Wallace White
ATT'Y.
COLUMBIA PLANOGRAPH CO., WASHINGTON, D. C.

UNITED STATES PATENT OFFICE.

NICOLAS GASTON BOUILLAT, OF BRON, FRANCE.

HANDLE-BAR FOR CYCLES.

1,053,150.  Specification of Letters Patent.  Patented Feb. 18, 1913.

Application filed May 14, 1912.  Serial No. 697,154.

*To all whom it may concern:*

Be it known that I, NICOLAS GASTON BOUILLAT, a citizen of the French Republic, residing at Bron, Rhone, in France, have invented a certain new and useful Improvement in Handle-Bars for Cycles, of which the following is a specification.

The present invention relates to improvement in handle bars for cycles and has for its object improved shock absorbing means applicable to cycle handle bars of the kind provided with a horizontal extension to the vertical part of the handle bar or steering post.

The improved shock absorbing means suppress vibrations of the handle bar fatiguing to the rider and absorbs shocks, which might be transmitted through said handle bar.

The annexed drawing illustrates the invention and shows a section of a handle bar of the kind described, taken transversely through the center of the handle bar proper and longitudinally through the extension. The front part of the horizontal extension 1 of the steering post 17 carries two lugs 2, one of which carries a hinge 3 on which is articulated a collar piece 4 which is fastened at 5 by a bolt 18 and nut 19 and incloses with a slight amount of play an elastic ring 6 forming a collar fixed to the handle bar proper 7. Between the two outwardly curved ends 20 of the ring 6 is fixed, by means of a screw 8, the flattened end 21 of a lever 9 articulated at 10 to a member 11 against the cup-shaped end 22 of which the one end of a coil spring 12 bears. The other end of this spring bears against a cup-shaped abutment 13 which is normally fixed, but regulatable as regards its position to adjust the resistance of the spring. This regulation is obtained by means of a screw 14 screwed through a cap 15 and the said screw being fixed firmly in position by a counter nut 16 on the outside of cap 15.

The spring 12 normally maintains the handle bar in the position illustrated.

It can be understood that during travel of the cycle, the shocks and vibrations borne by the extension 1 are greatly absorbed and are only slightly transmitted to the handle bar as the latter is oscillatory and is provided with the cushioning means constituted by the spring 12 which is compressed when the handle bar drops.

A space 17 is provided between the lugs 2 to allow of the oscillatory movement of the lever 9.

It is to be noted that the normal position of the handle bar can be adjusted to suit the rider's requirements.

What I claim as my invention and desire to secure by Letters Patent of the United States is:—

1. In a cycle steering bar, the combination of a vertical member, a horizontal hollow extension thereto, a handle bar capable of oscillation about its axis, an elastic ring fixed upon said handle bar, lugs upon said extension and a collar piece secured to said lugs and surrounding said ring, a lever connected to said ring and extending into said extension, and spring cushioning means within said extension and in connection with said lever for cushioning the oscillatory movement of the handle bar in one direction.

2. In a cycle steering bar, the combination of a vertical member, a horizontal hollow extension thereto, a handle bar capable of oscillation about its axis, an elastic ring fixed upon said handle bar, lugs upon said extension and a collar piece secured to said lugs and surrounding said ring, a lever connected to said ring and extending into said extension, a member pivoted to said lever within said extension, a coil spring in said extension abutting with one of its ends against said member, an adjustable abutment for tensioning said spring, a screw cap upon the free end of the horizontal extension and means carried by said cap for adjusting the position of said abutment.

In witness whereof I have signed this specification in the presence of two witnesses.

NICOLAS GASTON BOUILLAT.

Witnesses:
 GASTON YEAUNIAUX,
 CLARENCE CARRIGAN.

Copies of this patent may be obtained for five cents each, by addressing the "Commissioner of Patents, Washington, D. C."